United States Patent [19]

Parker et al.

[11] Patent Number: 5,690,987

[45] Date of Patent: Nov. 25, 1997

[54] FOOD GRADE PROCESSING METHOD AND PRODUCTS OBTAINED THEREFROM

[75] Inventors: Wilbur A. Parker; James R. Baxley; Ricky C. Boyce, all of Edenton; Thomas Mitchel Morris, Hertford, all of N.C.

[73] Assignee: Seabrook Enterprises, Inc., Atlanta, Ga.

[21] Appl. No.: 613,339

[22] Filed: Mar. 11, 1996

Related U.S. Application Data

[63] Continuation of Ser. No. 266,936, Jun. 27, 1994, abandoned.

[51] Int. Cl.$^6$ .................................................. A23P 1/12
[52] U.S. Cl. ........................ 426/632; 426/468; 426/472; 426/489; 426/601; 426/629
[58] Field of Search ................................ 436/632, 629, 436/468, 472, 489, 601

[56] References Cited

U.S. PATENT DOCUMENTS

| | | | |
|---|---|---|---|
| 617,266 | 1/1899 | Watson | 426/632 |
| 3,294,549 | 12/1966 | Vix et al. | 99/126 |
| 3,901,983 | 8/1975 | Matsunaga | 426/632 |
| 4,190,577 | 2/1980 | Steele et al. | 260/123.5 |
| 4,650,857 | 3/1987 | May | 530/377 |
| 5,079,027 | 1/1992 | Wong et al. | 426/633 |
| 5,164,217 | 11/1992 | Wong et al. | 426/632 |

FOREIGN PATENT DOCUMENTS

| | | | |
|---|---|---|---|
| 2007 961 | 5/1979 | United Kingdom | A23L 1/38 |

OTHER PUBLICATIONS

"Hander Instruction Manual for Hander Oil Expeller," *Hander Oil Machinery Corp.*, pp. 1–24 (date unknown).

*The Anderson Grain Expander*, Bulletin GE–466, 4 unnumbered pages (date unknown).

"'Hander' Oil Expellers," *Hander Oil Machinery Corporation*, Type EX 100, 10 HP, six unnumbered pages (date unknown).

"'Hander' Mechanical Oil Extraction," *Hander Oil Machinery Corporation*, two page brochure (date unknown).

"'Hander' Oil Expeller Type EX 100," *Hander Oil Machinery Corporation*, two unnumbered pages, instructions and nomenclature (date unknown).

"Increase Your Income with a Hander Oil Mill," *Hander Oil Machinery Corporation*, four pages (as copied) (date unknown).

"The Most Versitle Expander for Processing High and Low Oil Bearing Seeds Ahead of Solvent Extraction," *Anderson International Corp.*, one page brochure (date unknown).

"Anderson Twin Motor Super Duo Expeller Presses," *Anderson International*, one page (date unknown).

*Primary Examiner*—Helen Pratt
*Attorney, Agent, or Firm*—Needle & Rosenberg, P.C.

[57] ABSTRACT

A method for producing a high-quality, low oil content, concentrated protein cake from oil seeds, such as peanuts, almonds, soybeans and blends thereof, in which oil seeds having a moisture content of between about 5 and 9 percent by weight are blanched, quickly heated for sterilization to about 71°–99° C., and pressed in a screw press expelling device preheated to about 107°–132° C. The heating of the oil seeds can be done by flash sterilization in a hot oil bath, which can be oil seed oil, including oils obtained as a byproduct of the process. Dry heating is also possible. The process produces an essentially sterile concentrated protein cake having an oil content of about 10% or less and a protein dispersibility index of about 86% or higher, which makes it suitable for most food grade requirements without roasting. The solid cake material which is at least 50% protein is sufficiently clean for use in products that receive only minimum heat during processing, and can also be roasted to any desired degree of browning to enhance flavor. The protein product cake can be ground to produce a high-quality, low fat protein flour that can be used in a variety of products that require an undenatured protein product. The protein rich cake that results from the process can be re-pressed a second time to remove additional oil without significantly degrading the protein. A high grade oil is also obtained as a byproduct of the process. The oil and protein rich cake are both free of solvents.

30 Claims, 1 Drawing Sheet

EFFECT OF MOISTURE CONTENT ON OIL REMOVAL IN SCREW PRESSING OF RAW, BLANCHED, MEDIUM RUNNER PEANUTS

FOOD GRADE PROCESSING METHOD AND PRODUCTS OBTAINED THEREFROM

This application is a Continuation of application Ser. No. 08/266,936, filed Jun. 27, 1994, now abandoned.

FIELD OF THE INVENTION

This invention relates generally to a food processing method and products produced therefrom, and more specifically to a method of processing oil bearing seeds and the oil and protein rich flour obtained thereby.

BACKGROUND OF THE INVENTION

There is no cheaper or more promising source of protein for the human diet than oilseeds. When oil is pressed or extracted from seeds such as cotton, soybean and peanuts, the resulting meal or flour contains approximately 50–60% protein. Most of this potential, however, has remained unrealized. About 57% of the world's peanut production is crushed to produce peanut oil. Although a defatted meal remains after crushing, current processes leave it denatured and generally marketable only as animal feed, or fertilizer which has considerably less value than the peanut oil that is extracted.

For the defatted meal to be suitable for human consumption, it is necessary, for most users, that the protein be substantially undenatured. Prior art processes for commercial pressing for oil vary in the severity of treatment of the oilseed, but all generally cause substantial or considerable denaturing of the protein in the defatted meal.

The primary processing technique presently used to extract oil from raw peanuts (and other oil bearing seeds) is screw pressing. This processing technique is used because the simplistic designs of the presses allow economical operation with low initial capital requirement. In the last hundred years, many different types of continuous presses have been designed, built and evaluated. These presses function best when the oil seeds have been adjusted to 10% moisture content and cooked to 110° C. for one hour, followed by drying to 2% to 3.5%.

It is very common to solvent extract the residual press cake or meal as revealed in the Steele, et al, U.S. Pat. No. 4,190,577. Solvents normally include hexane or ethyl alcohol.

May, U.S. Pat. No. 4,650,857 instructs on a peanut process for producing a storage stable, high protein solubility flour at temperatures below 38° C., which is a combination of screw pressing and solvent extraction.

Five basic steps are employed in continuous screw press operation techniques to ensure efficiency and a consistent quality product. These steps are:

(1) Starting Raw Material

Accumulate a sufficient volume of seed that becomes the raw material to be processed. Before processing, it must be assured that the seeds are free from trash, grit, sand, and especially tramp metal that could damage or cause excessive wear to the press. Such factors as the oil content of the seeds, the quality of the oil (PV, FFA, etc.), the protein content, and the moisture content of the seeds must be determined. The protein content is important if the protein of the cake (a major part of the material remaining after pressing out the oil) must achieve a minimum level, while the moisture content can be critical to pressing.

(2) Cooking and Conditioning

Prior to cooking, it is common to reduce the particle size of the oil seed using cracking or granulating rolls for more effective heat penetration.

The majority of the screw press oil mills the world over use vertical or horizonal cookers employing steam jacketed sides or bottoms, with a slow stirring shaft with properly designed sweeps to mix the seeds, turn them over uniformly to prevent scorching and ensure uniform treatment through the cooker. It is quite uniformly accepted throughout the industry that the seeds should be cooked at a high moisture content for approximately 20 minutes, with a minimum of evaporation, at a temperature of about 87° C. This cooking ensures that the action of the enzymes that increase the free fatty acids will be arrested and rupturing of the oil cell walls will be completed. It is during cooking that the liquid proteins are coagulated, assisting in subsequent cake formation. The cooking is continued to dehydrate the seeds to the proper moisture for best extraction and to raise the temperature to that most desirable for pressing. Typically, seeds having 7–8% moisture are introduced into the top of the cooker at ambient temperature. The moisture can be, and sometimes is increased to 10% by water or steam spray into the cooker, in which case the cooked conditioned meat may typically come from the cooker after 50–60 minutes at a temperature of 115° C. and a moisture content of 2.2%.

(3) Pressing

The third step is pressing the oil bearing seed in the screw press. To attain efficient pressing it is absolutely essential that the first two steps are properly performed, and that the cooker be uniformly loaded and stabilized at all times.

The screw press is a screw of increasing root diameter and decreasing pitch revolving in a cylindrical drainage cage. The screw is rotated by a gear box containing gears, shafts and bearings driven by an electric motor. At the discharge end of the rotating screw shaft is a variable orifice to make fine adjustments of the back pressure against the discharging cake. A variable speed feeder feeds the properly cooked and conditioned oil-bearing seed to the inlet hopper at a constant rate. The pressed cake typically has a residual oil content of 5–6%, by weight.

A prepress differs from a total press in that it requires less horsepower and has a residual oil (cake) requirement in the range of 10–15%. A total press requires more horsepower, larger motor and drive, with the objective to obtain an oil content of 5%. Because a total press operates under higher pressures, it is likely to have less capacity for an identical screw-size. At times a pre-press can operate in tandem with a total press for improved efficiency.

(4) Oil Handling

The fourth step is the pumping and filtration of the oil to remove the peanut solids. Since even a small amount of expelled solids creates problems in filtration and storage, and because of the great volume of oil that must be handled in continuous operation, great care must be used in selecting a filtration system. The solids removed during the filtration step are normally re-cycled to the feed of the cooker and re-processed through the screw press.

(5) Solvent Extraction

Since oil is the primary product the pressed cake containing 5–10% oil, is normally milled to reduce the particle size and the remaining fat extracted with solvents to reduce the oil content to around 1%, by weight. Solvents that are used include acetone, hexane, ethyl alcohol, etc. A single solvent or blend can be utilized.

The cooking and high-pressure during screw pressing darkens the color of the oil seeds and noticeably reduces the solubility of the protein. The protein solubility may be reduced to as low as 58–60%, indicating that the meal protein is extensively denatured.

Some prior art processes are known that produce a partially defatted peanut flour with little or no denaturization. For example, a Partially Defatted Peanut Flour is prepared from raw peanuts that have been cleaned, and dried to a moisture content of 4.5–5.5%, by weight. The dried peanuts are blanched and electronically sorted to remove damaged and discolored nuts.

As revealed in the Vix, et al invention for Partially Defatted Nut Meats and Process, U.S. Pat. No. 3,294,549 nuts are charged into a cylindrical cage or mold made of vertical bars with narrow slits between bars. A typical cage is 51 cm in diameter and will hold approximately 129 kg of peanuts. Hydraulic pressure, using peanut oil as the hydraulic fluid, is applied by a ram which forms the moveable bottom of the cage. As the ram is advanced upward, oil is pressed from the peanuts and flows through the slits separating the bars into catch basins. A typical press cycle will apply 2000–3500 psi of pressure for 1 hour, reducing the oil content to 30%. The entire pressing cycle is performed at room temperature. No heat is applied. The pressed, raw peanuts are ground into a flour, or meal. While this method suffers from a slow production rate and requires batch production techniques (as opposed to continuous production), the resulting partially defatted raw peanut flour has high protein solubility and good shelf life. Unfortunately, the flour also contains an undesirably high percentage of residual oil (30%) and has an objectionable raw, beany flavor, which limits the uses of the product. Flour from this process has unacceptable levels of microbiological contamination. When roasted after pressing, the flavor and microorganism count improve but the resulting product has a short shelf life and the roasting increases the already high percentage oil content (32%). The roasted product, because of the high oil content and denaturing of proteins caused by roasting, also has limited uses.

A modification of this batch process is revealed by Wong, et al, U.S. Pat. No. 5,164,217 where-in the peanuts are mixed with a particulate such as salt, sucrose, sand, etc. to assist in reducing the oil content and then removing the particulates from the pressed, partially defatted peanuts by washing with water.

Roasted peanut flour produced by charging a hydraulic press (typically utilized in cocoa production) with a ground, roasted paste (butter), generally has a more moderate oil content (15–25%) than that using the hydraulic pressure procedure, described above. The resulting flour has good roasted flavor and acceptable microorganism count. Wong, et al, U.S. Pat. No. 5,079,027 utilized this process to obtain a low fat roasted flour in the production of a lower fat Nut Butter and Nut Solid Milling Process. The protein from such a process is roasted and essentially denatured. The oil produced by such pressing also has a slight roasted flavor, which may be desirable. However, this more costly method also suffers from a low semi-continuous production rate, and a flour with low protein solubility. The low solubility of the roasted protein flour and the relatively high oil content limits use of this product, in spite of the other advantages of peanut flour obtained using a cocoa press.

Processing of roasted peanuts in a screw press is difficult because of the denatured proteins. There is no known technique of processing roasted oil seeds in a screw press to produce an edible functional cake.

Thus, to provide an inexpensive source of low-fat food-grade protein from the widely available low-cost oil seeds, a new method of protein extraction is required. It would be also highly desirable for this method to operate continuously and efficiently to produce a protein product with low oil content, little if any denaturing, high protein solubility, and an acceptable flavor to enable it to be used in a wide variety of products. It is also highly desirable that the method produce a protein product that is essentially free from microorganisms, to ensure a long storage life without requiring the use of preservatives or additives. Because of the value of oil from oil seeds, it would also be desirable if the process could simultaneously produce high quality, food-grade oil in addition to edible protein cake.

BRIEF DESCRIPTION OF THE INVENTION

In accordance with the present invention, a food-grade protein cake product may be produced from any of the various edible oil seeds or nuts and including peanuts, by a process comprising the steps of:
(a) adjusting oil seeds to a selected moisture content, or selecting seeds having a predetermined moisture content;
(b) pre-treating the dried (or selected) oil seeds by heating them for not more than approximately one–three minutes so that the dried oil seeds reach a final temperature of between about 71°–99° C.;
(c) preheating an expelling device to a temperature between about 107°–132° C.; and
(d) pressing the sterilized oil seeds in the heated expelling device so that low-fat solid protein cake and oil are separated from the sterilized oil seeds.

The oil seeds should, of course, be cleaned of foreign materials prior to drying. The testa or seed coat may be removed if blanched nuts are to be processed.

The resulting cake may optionally be roasted or dried, or it may be further processed into any of a number of high-quality, edible products. The oil that is pressed out, which is also of high quality, may be processed in a holding tank to remove solid materials, and then pumped into a filter press or centrifuge for further purification. A portion of the processed oil may be used to supply oil for the pretreating step; the remainder may be stored and used for any other purposes for which high-quality, food-grade oil may be used.

It is thus an object of this invention to produce an edible, high-quality low-fat protein cake material from oil seeds or nuts.

It is further object of this invention to reduce the conditioning time for processing from the 30–60 minutes generally required under prior art processes to approximately 2 minutes or less, thereby reducing the amount of protein denaturing that occurs during processing.

It is a further object of this invention to process oil and edible cake from oil seeds without an extended cooking-conditioning step, thereby reducing processing costs by reducing the amount of energy required for processing.

It is further object of this invention to avoid the denaturing of the protein in a process for extracting oil and cake from oil seed, yet provide sufficient processing to ensure low microorganism count in the products produced from the process.

It is still further object of the invention to produce an edible, high-quality protein cake from oil seed, while also separating an oil of high quality, so that the oil can be further refined if desired.

It is yet another object of this invention to provide a process for separating oil and high-quality, edible protein cake from oil seeds, while preserving the greatest amount of nutritional quality of the starting raw material.

It is still further object of this invention to produce a food-grade flour from oil seeds or nuts.

These and other objects of the invention and the way in which each is achieved will become clear to one skilled in the art upon the reading of the detailed description below.

DETAILED DESCRIPTION OF THE INVENTION

Figure 1:
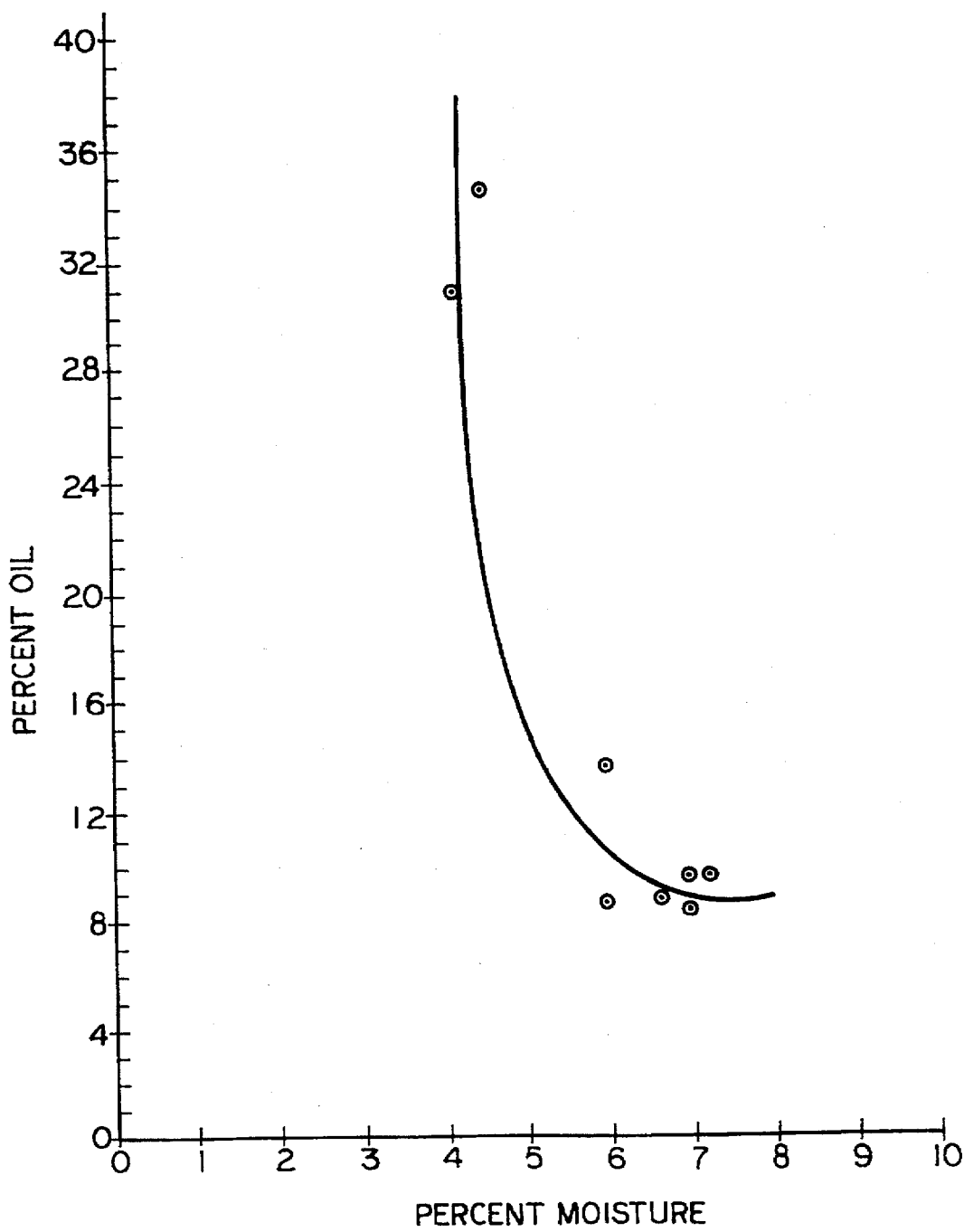
FIG. 1 is a graph showing oil extraction efficiency of the inventive process as a function of moisture content of the oil seed. This graph illustrates a preferred range of moisture content for oil seed extraction. The seed moisture can be adjusted both down (drying) or up (addition) to the starting seed depending on the initial moisture content.

In a preferred embodiment of the invention, blanched peanuts are fed onto a conveyor at a continuous rate of about 454 kg per hour. Although blanched peanuts having a different moisture content can be used, it has been found that uncooked peanuts having a moisture content of preferably about 5–6% provide the highest quality protein cake and lowest oil content out of the expelling device. In any event, it is important that the moisture content of the oil seed be kept within the range 5–9%, and more preferably within the range 5–6%, because percentages outside of this range can result in reduced efficiency of oil extraction (see FIG. 1) and improper operation of the screw press. The use of uncooked nuts avoids processing that would otherwise result in protein insolubilization and chemical browning during the pressing of the peanuts. The peanuts are flash pre-heated by immersing or dipping them in peanut oil at a temperature of 116°–132° C. for a sufficient time, usually 2 minutes, to obtain a nut temperature of 82°–93° C. The pre-heated nuts are then immediately conveyed to an expelling device or screw press heated to 107° C. Although other types of expelling devices can be used, such as a cage press or a cocoa press, a screw press is preferred, as it permits the peanuts to be pressed to between 5–15% residual oil, with 5–10% being preferable, and 8–10% being more preferable. This process produces less heat damage than would occur if the peanuts were fully cooked first and then screw-pressed, as is current commercial practice.

Conventional oil cookers, manufactured by Sandvik Process Systems, Heat & Control, and Pittman Mastermatic, which are continuous oil cookers are sufficient for the oil conditioning step.

Dry heat application is also possible through the use of industrial microwave driers and conventional air roasters, and also dry expanders such as the 8" Diameter Anderson Dox Hivex Dry Expander (TM) which conditions the seeds under pressure and heat of friction.

Press cake produced by this process has very little, if any, color change, no off flavors, does not undergo browning from the typical Maillard browning reaction of roasting and has excellent protein quality, as indicated by a Protein Dispersibility Index of 85%. Shelf life is very good when the product is stored at ambient temperature, as indicated by a water activity (Aw) measurement of 0.4–0.49, which is an indicator of potential microbiological spoilage.

The rapid, flash pre-heat in the peanut oil, in combination with the expelling device temperature and the absence of additional moisture or steam in processing, produces a clean, almost sterile, microbiologically safe product that meets all food grade requirements without roasting. The solid protein product that results is sufficiently clean for use in milk and other dairy products, toppings, and other products that receive only minimum heat during processing. In addition, since no solvents are needed for this process, the resulting protein product has no solvent residue.

The unroasted, processed high protein cake, whether produced from peanuts or other edible oil seed nut, is especially suitable for use in extruded products, such as cereals, chips, and snack foods, or beverages, such as protein drinks or coffee whiteners. Other uses include cheese yogurts; peanut (or other edible oil seed) protein concentrates; vegetable burgers, franks, and sausages; meatless salads; and non-dairy toppings and other imitation dairy products. Although roasting is not necessary for use (and can be undesirable for applications requiring minimally denatured protein), roasting to any desired degree of browning can be done to enhance flavor for use in traditional roasted products, formulating reduced fat peanut butters and confectionery products.

Although pressing of the nuts may be done in either a screw press, a cocoa press, or a cage press, it has been found experimentally that the screw press product produces a slightly higher protein percentage.

Screw pressing can be accomplished using a commercial Anderson-Cantrell Model 33 Continuous Screw Press or similar equipment manufactured by the French Oil Machinery Co., Piqua, Ohio, or equipment of similar design.

Protein contents for the different processes are given in Table I. (All percentages in each of this and the other examples are by weight.)

Protein values were derived by multiplying the nitrogen content ($N_2$) result by a factor of 6.25.

TABLE I

| Press Type | Protein Percentage (Dry Basis) |
|---|---|
| Continuous Screw Press | 58 |
| Semi-Continuous Cocoa Butter Press | 56 |
| Batch Cage Press | 45 |

Analysis has also shown that the Protein Dispersibility Index remains high in peanuts pressed using the inventive process, in part because the discharge from the expelling device is neither raw nor roasted, but is instead "processed". The measured Protein Dispersibility Index (PDI) for various peanut products is given in Table II.

TABLE II

| Source | Protein Dispersibility Index |
|---|---|
| Raw Peanuts | 92% |
| Processed Peanut Cake | 86% |
| Roasted Nuts | 59% |

A high PDI is essential in product applications involving vegetable meat patties, extruded products, whipped toppings, cheese and yogurts, coffee whiteners, and other similar food products. Roasted flours cannot meet the necessary performance characteristics required by these applications because the protein is denatured.

The flavor of roasted protein cake prepared in accordance with the invention has a slight roasted peanut flavor and aroma that becomes more intense as the roast is darkened. Raw and "beany" off-flavors are completely absent in the roasted protein meal. The processed, pressed cake has a pleasant, slightly starchy flavor, without the "green, beany" flavor associated with raw peanuts. If the recommended oil seed moisture content is adhered to, the maximum amount of oil extraction will occur, and the best flavor and highest quality protein cake will be obtained. Compared to other peanut flours, peanuts of 5–6% moisture, when processed in accordance with this invention, produce the lowest average oil content—between 5–15%—when compared to other peanut flours, as shown in Table III.

TABLE III

| Process | Oil Percentage in Peanut Flour |
|---|---|
| Cage Press | 28–42%, avg. 32% |
| Cocoa Press | 10–20%, avg. 15% |
| Screw Press | 5–15%, avg. 10% |

The following examples are provided for illustrative purposes only. While the invention may be better understood with reference to these examples, the examples are not to be interpreted as limiting the scope of the invention.

EXAMPLE I

Peanuts of the Medium Runner variety were dried to a moisture content of 5.75% and whole nut blanched to remove the testa or seed coat. The split kernels, as a result of the blanching process, were 39% of the blanched peanuts by weight. Table IV provides the analytical data on the blanched peanuts.

TABLE IV

Analysis of Raw, Blanched Peanuts
(Medium Runners, 1993 Crop Year)

| ANALYTICAL | | MICRO | |
|---|---|---|---|
| Oil % | 48.5 | Plate Count/g | 9100 |
| Moisture % | 5.75 | Coliform MPN/g | >1100 |
| Free Fatty Acid % | 0.14 | E. Coli MPN/g | Neg. |
| Peroxide value meq/kg | 0.60 | Salmonella/375 g | Neg. |
| | | Mold/g | 290 |
| Color (Paste) Gardner L | 62.66 | Yeast/g | <10 |
| | | Staph Coag. + MPN/g | Neg. |
| Protein % | 28.7 | | |

For each test approximately 40.8 kg of peanut oil was pre-heated to 116°–121° C. and 9 kg of the blanched peanuts were dipped into the heated oil for a period of 2 minutes. The temperature of the nuts after dipping was measured at 99° C. The moisture content decreased to 5.25% by weight, as measured by the standard method AOCS Ab 2–49 for moisture content.

Data on the microbiological analysis after the oil treatment are shown in Table V.

TABLE V

| Microbiological Analysis After Oil Treatment | |
|---|---|
| Standard Plate Count | 170 |
| Coliform MPN/g | <3 |
| E. Coli MPN/g | Neg. |
| Salmonella/375 g | Neg. |
| Mold/g | <10 |
| Yeast/g | <10 |
| Staph Coag + MPN/g | Neg. |

The conditioned nuts were continuously fed into a Hander Type M Screw Press preheated to 121° C., using external electric heat. The nut temperature into the feed hopper of the press was maintained at an average temperature of 82° C., with the press screw operating at a fixed RPM of 76 and a feed rate of approximately 27.2 kg/hour. The discharge of the press produced an excellent cake, with a large continuous curl and a cake thickness measured at 0.075 inches. The residual oil content in the cake was 9.50% as tested by AOCS Ab 3–49, using methylene chloride as the extraction solvent. The oil discharge from the press was at a constant rate and at a temperature of 96° C.

Analysis of the flour ground from the press cake is shown in Table VI.

TABLE VI

Analysis of Low Fat Peanut Flour
Produced With Minimum Heat Treatment

| ANALYTICAL | | MICRO | |
|---|---|---|---|
| Oil % | 9.5 | Standard Plate Count | 50 |
| Moisture % | 7.0 | Coliform MPN/g | <3 |
| Color, Gardner L | 72.0 | E. Coli MPN/g | Neg. |
| Aflatoxin, ppb | 2.9 | Salmonella/375 g | Neg. |
| Water Activity (Aw) | 0.41 | Mold/g | <10 |
| Protein % | 54.0 | Yeast/g | <10 |
| Protein dispersibility index | 89.4 | Staph Coag. + MPN/g | Neg. |

The crude oil collected from the screw press was filtered through a glass fiber filter to remove the finely dispersed solids, which totaled about 9.9–12.2% by weight. Analysis of the filtered oil is shown in Table VII.

TABLE VII

| Analysis of the Expressed, Filtered Oil | |
|---|---|
| Free Fatty Acid | 0.12% |
| Peroxide Value meq/kg | 0.60 |
| Photometric Color | 0.19 |
| Moisture | 0.00% |
| Solids | 0.00% |

As will be evident to one skilled in the art, the process described in this example produces a high-quality, low-fat, edible protein cake at low cost that may be used in a wide variety of food products, as well as a very high quality oil.

EXAMPLE II

Peanuts of the Extra Large Virginia variety were dried to a moisture content of 5.34% and whole nut blanched to remove the testa or seed coat. The split kernels, as a result of the blanching process, were 15% of the blanched peanuts by weight.

Table VIII provides the analytical data on the blanched peanuts.

TABLE VIII

Chemical and Microbiological Analysis
of Raw, Blanched Extra Large
Virginia Variety Peanuts

| ANALYTICAL | | MICRO | |
|---|---|---|---|
| Moisture | 5.34% | Plate Count | 120 |
| Oil | 46.10% | Coliforms MPN/g | 43 |
| Peroxide Value meq/kg | <1.0 | E. Coli MPN/g | Neg. |
| Free Fatty Acids | 0.46% | Salmonella/375 g | Neg. |
| Color (Paste) Gardner | 66.0 | Yeast/g | <10 |
| | | Mold/g | 65 |
| | | Staph MPN/g | Neg. |

For each test 40.8 kg of peanut oil was pre-heated to 135°–141° C. and 11.4 kg of the blanched peanuts were dipped into the heated oil for a period of 2 minutes. The temperature of the nuts, after dipping, was measured at 93° C., and the moisture content decreased to 5.18% by weight, as measured by the standard oven method AOCS Ab 2-49.

Data on the microbiological analysis after the oil treatment are shown in Table IX.

TABLE IX

| Microbiological Analysis After Oil Treatment | |
|---|---|
| Standard Plate Count | 35 |
| Coliform MPN/g | <3 |
| E. Coli MPN/g | Neg. |
| Salmonella/375 g | Neg. |
| Mold/g | <10 |
| Yeast/g | <10 |
| Staph MPN/g | Neg. |

The heat conditioned nuts were continuously fed into a Hander Type M screw press pre-heated to 107°–132° C. using external electric heat. The nut temperature into the feed hopper of the press was maintained at 93° C. With the press screw operating at a fixed RPM of 76 and a feed rate of approximately 27 kg/hour, the discharge curl had a cake thickness measured at 0.070 to 0.080 inches. The oil residual of the cake was 9.2% as tested by AOCS Ab 3-49, using methylene chloride as the extraction solvent. The oil discharge from the press was at a constant rate, and at a temperature of 96° C.

Analysis of the flour ground from the press cake is shown in Table X.

TABLE X

Summary Of Chemical And Physical Parameters Of Low Fat Peanut Flour Produced With Minimum Heat Treatment

| ANALYTICAL | | MICRO | |
|---|---|---|---|
| Moisture | 7.10% | Standard Plate Count/g | <10 |
| Oil | 9.20% | Coliform MPN/g | <3 |
| Color (Gardner "L") | 75.45 | E. Coli MPN/g | Neg. |
| Aflatoxin ppb | 0.0 | Salmonella/375 g | Neg. |
| | | Yeast/g | <10 |
| | | Mold/g | <10 |
| | | Staph MPN/g | Neg. |

The crude oil collected from the screw press was filtered through a glass fiber filter to remove the finely dispersed solids which totaled about 6%. Analysis of the filtered oil is shown in Table XI.

TABLE XI

| Analysis of Filtered Oil | |
|---|---|
| Free Fatty Acids | 0.30% |
| Spectrophotometric Color | 0.17 (Method AOCS 13-C-50) |
| Moisture | 0.00% |

EXAMPLE III

Six kg of blanched almonds with a moisture content of 5.42% were dipped in peanut oil for 2 minutes at an oil temperature of 135° C.

After draining for 1 minute the almonds at 93° C. were added to the feed hopper of a Hander Model M screw press. The press temperature ranged from 127°–132° C.

With the screw press operating at a fixed RPM of 76 and a feed rate of approximately 27 kg per hour, the discharge of the press produced an excellent cake with a large continuous curl and cake thickness of approximately 0.070 inches. The oil residual of the cake was 9.9%.

EXAMPLE IV

Peanuts of the Runner variety, medium grade, shelled redskins, were analyzed to have the chemical and microbiological properties listed in table XII

TABLE XII

Analysis of Runner Variety Peanuts

| ANALYTICAL | | MICRO | |
|---|---|---|---|
| Moisture | 6.32% | Plate Count/g | 4300 |
| Oil | 48.30% | Coliforms MPN/g | 1100 |
| Peroxide Value meq/kg | <1.0 | E. Coli MPN/g | Neg. |
| Free Fatty Acids | 0.16% | Salmonella/375 g | Neg. |
| | | Yeast/g | <10 |
| | | Mold/g | 3800 |

Using the above peanuts, 11.6 kg were conditioned in hot oil at 99°–107° C. for 2.0 minutes to attain a kernel temperature of 71° C., and a moisture content of 5.06%, by weight.

The peanuts at a temperature of 71° C. were fed into a Hander pilot expelling device, pre-heated to a screw jacket temperature of 118° C. Feed rate was controlled to obtain 27 kg/hour at the feed inlet.

Peanuts of this type, under these conditions, produced a solid cake having an oil content of 10.1%, protein of 49.8%, moisture at 7.78%, and a protein material that was essentially sterile, i.e. <10 on Plate count, Yeast, and Mold with E. Coli, Coliforms and Salmonella, negative by standard tests.

EXAMPLE V

Press cake obtained from a single pass through a screw press was recycled back through the press to evaluate re-pressing as a way to obtain a cake with less residual oil. The surprising result from the re-pressing was that a very satisfactory cake was obtained that was lighter in color and more neutral in flavor than the press cake obtained from a single pass. The oil content in the re-pressed cake was also 40% lower than the oil content of the press cake obtained from a single pass through the press, as shown in Table XIII.

TABLE XIII

Properties of Recycled Press Cake

| | SINGLE PRESS | DOUBLE PRESS |
|---|---|---|
| Nut temperature into press °C. | 98 | N/A |
| Cake temperature into press °C. | N/A | 68 |
| Press jacket temperature °C. | 121 | 121 |
| Pressed oil temperature °C. | 99 | 88 |
| Pressed cake temperature °C. | 77 | 74 |
| Rate per hour, kg. | 27 | 27 |
| Cake thickness in. | 0.085 | 0.080 |
| Color, Gardner L | 69.81 | 70.36 |
| Moisture % | 6.82 | 7.14 |
| Oil % | 12.7 | 7.6 |
| Reduction in oil % | N/A | 40.15 |

EXAMPLE VI

Shelled peanuts of the runner variety, medium grade, 1993 crop year were blended with unhulled soybeans of the Young variety at 75% peanuts and 25% soybeans, in an effort to improve the amino acid profile of the resulting protein. Analysis of the peanuts is shown in Table XIV. Analysis of the soybeans is shown in Table XV.

TABLE XIV

Analysis of Peanuts (Medium Runners, 1993 Crop Year)

| ANALYTICAL | | MICRO | |
|---|---|---|---|
| Oil | 48.5% | Plate Count/g | 9100 |
| Moisture | 5.75% | Coliform MPN/g | >1100 |
| Free Fatty Acid | 0.14% | E. Coli MPN/g | Neg. |
| Peroxide value meq/kg | 0.60 | Salmonella/375 g | Neg. |
| | | Mold/g | 290 |
| Color (Paste) Gardner L | 62.66 | Yeast/g | <10 |
| | | Staph Coag. + MPN/g | Neg. |
| Protein | 28.7% | | |

TABLE XV

Analysis of Soybeans Utilized in a 25% Blend with Peanuts

| ANALYTICAL | | MICRO | |
|---|---|---|---|
| Moisture | 9.89% | Standard Plate Count/g | 12000 |
| Oil | 18.10% | Coliforms MPN/g | 240 |
| Peroxide Value meq/kg | 2.33 | E. Coli MPN/g | Neg. |
| | | Salmonella/375 g | Neg. |
| Free Fatty Acids | 0.24% | Yeast/g | <10 |
| Loose Hulls | 0.21% | Mold/g | 330 |
| Protein | 19.9% | Staph, Coag + MPN/g | Neg. |

The peanut/soybean blend was tested and found to have 6.78% moisture, on a wet basis and 40.9% oil, by weight.

Using the above prepared blend, approximately 40.82 kg of peanut oil was preheated to 107° C., and 4.54 kg of the peanut/soybean blend were dipped into the heated oil for a period of 2 minutes. The temperature of the peanut/soybean blend, after dipping, was measured at 88° C. After draining for 1 minute, the blend was continuously fed into a Hander Type M Screw Press preheated to 121° C. using external electric heat. The temperature of the blend into the feed hopper of the press was maintained at 88° C. With the expeller screw operating at a fixed RPM of 76, and a feed rate of approximately 27 kg/hr, the press produced excellent cake with a thickness of approximately 0.072 inches.

The cake discharging from the screw press tested at an oil residual of 8.2%, discharging at a temperature of 71° C. The oil discharge from the press was at a constant rate at a temperature of 96° C.

Analysis of the peanut/soy flour ground from the press cake contained a very satisfactory flavor. The analytical and microbiological data is reported in Table XVI.

TABLE XVI

Analysis of the Low Fat Peanut/Soybean Flour blend (75/25)

| ANALYTICAL | | MICRO | |
|---|---|---|---|
| Moisture | 6.0% | Standard Plate Count/g | 130 |
| Oil | 8.2% | Coliforms MPN/g | 4 |
| Peroxide Value meq/kg | <1 | E. Coli MPN/g | Neg. |
| | | Salmonella/375 g | Neg. |
| Free Fatty Acids | 0.16 | Yeast/g | <10 |
| Protein | 54.0% | Mold/g | <10 |
| | | Staph, Coag + MPN/g | Neg. |

While examples have been provided to show that the process provides the advantages described in the specification, many modifications of the process and uses of the products produced thereby will be evident to those in the art. It is to be understood that the examples are provided for illustration only, and not to limit the scope of the invention, which is to be defined by reference to the claims below.

What is claimed is:

1. A continuous method for producing a high-quality, food-grade protein rich cake from edible oil seeds comprising the steps of:
   (a) adjusting uncooked edible oil seeds to a selected moisture content;
   (b) sterilizing the uncooked edible oil seeds by heating them for not more than approximately two minutes so that the edible oil seeds reach a final temperature of between about 71°–99 ° C. and so that the moisture content of the edible oil seeds is maintained at or decreased below the selected moisture content;
   (c) preheating an expelling device to a temperature between about 107°–132° C.; and
   (d) pressing the sterilized oil seeds in the heated expelling device so that low-fat solid protein rich cake and oil are separated from the sterilized oil seeds.

2. The method of claim 1, wherein the sterilization step comprises immersion in heated oil from edible oil seeds for approximately two minutes.

3. The method of claim 2 in which the heated oil comprises oil produced by the process of claim 1.

4. The method of claim 2, further comprising the step of draining the sterilized oil seeds for approximately 1 minute after the immersion step.

5. The method of claim 2, wherein the heated oil is heated to a temperature of between about 99°–141° C.

6. The method of claim 1, wherein the sterilization step comprises heating the oil seed with a microwave drier.

7. The method of claim 1, wherein the sterilization step comprises heating the oil seed with a roaster.

8. The method of claim 1, wherein the sterilization step comprises heating the oil seed in an expander.

9. The method of claim 1, wherein the sterilization step comprises heating the oil seed under pressure by friction.

10. The method of claim 1, wherein a purified oil is obtained by the additional step of pumping the oil expelled by the pressing step into a filter press.

11. The method of claim 1, wherein a purified oil is obtained by the additional step of centrifuging oil expelled by the pressing step to remove solid materials.

12. The method of claim 1, wherein the pressing step comprises pressing the conveyed, sterilized oil seeds in a screw press.

13. The method of claim 1, wherein the pressing step comprises pressing the conveyed, sterilized oil seeds in a cocoa press.

14. The method of claim 1, wherein the pressing step comprises pressing the conveyed, sterilized oil seeds in a cage press.

15. The method of claim 1, wherein the selected moisture content is between 5 and 9 percent by weight.

16. The method of claim 1, wherein the selected moisture content is between 5 and 6 percent by weight.

17. The method of claim 1, and further comprising a second pressing step in which the solid protein cake is pressed in a heated expelling device to expel additional oil.

18. The method of claim 17, wherein the solid protein cake has a temperature of approximately 68° C. when the cake enters the expelling device for the second pressing.

19. The method of claim 1, and further comprising the step of grinding the protein cake to produce a flour.

20. The method of claim 1, and further comprising the step of blanching the oil seeds.

21. A low fat, essentially sterile oil seed protein cake having an oil content of less than about 10% by weight and a protein dispersibility index of at least about 86%.

22. The protein cake of claim 21 in which the oil seed is selected from the group consisting of peanuts, almonds, soybeans, and mixtures thereof.

23. The protein cake of claim 22 in which the oil seed is peanuts.

24. The protein cake of claim 22 in which the oil seed is almonds.

25. The protein cake of claim 22 in which the oil seed is a mixture of peanuts and soybeans.

26. A flour produced by grinding the protein cake of claim 21.

27. The protein cake of claim 22 in which no solvents are used in production and thus is free of solvent residue.

28. A method for producing a high-quality, food-grade protein rich cake from edible oil seeds comprising the steps of:

(a) selecting uncooked edible oil seeds to a selected moisture content;

(b) sterilizing the selected edible oil seeds by heating them for not more than approximately two minutes so that the edible oil seeds reach a final temperature of between about 71°–99 ° C. and so that the moisture content of the edible oil seeds is maintained at or decreased below the selected moisture content;

(c) preheating an expelling device to a temperature between about 107°–132° C.; and (d) pressing the sterilized oil seeds in the heated expelling device so that low-fat solid protein rich cake and oil are separated from the sterilized oil seeds.

29. The method of claim 28 in which the predetermined moisture content is between about 5% and 9% by weight.

30. The method of claim 28 in which the predetermined moisture content is between about 5% and 6% by weight.

* * * * *